United States Patent
Ishii et al.

(10) Patent No.: US 10,759,313 B2
(45) Date of Patent: Sep. 1, 2020

(54) TRIM COVER AND VEHICLE SEAT

(71) Applicant: TACHI-S CO., LTD., Tokyo (JP)

(72) Inventors: Atsushi Ishii, Tokyo (JP); Masayuki Taguchi, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 16/373,838

(22) Filed: Apr. 3, 2019

(65) Prior Publication Data

US 2019/0375319 A1    Dec. 12, 2019

(30) Foreign Application Priority Data

Jun. 6, 2018 (JP) .................. 2018-108571

(51) Int. Cl.
*B60N 2/58* (2006.01)
*B60N 2/22* (2006.01)

(52) U.S. Cl.
CPC .............. *B60N 2/58* (2013.01); *B60N 2/22* (2013.01); *B60N 2/5883* (2013.01); *B60N 2002/2204* (2013.01)

(58) Field of Classification Search
CPC .......... B60N 2/58; B60N 2/5883; A47C 31/02
See application file for complete search history.

(56) References Cited

U.S. PATENT DOCUMENTS

| | | | | |
|---|---|---|---|---|
| 2,506,915 A | * | 5/1950 | Bishop | B29C 65/5042 428/60 |
| 2,578,709 A | * | 12/1951 | Lyijynen | B60N 2/5866 428/172 |
| 3,728,875 A | * | 4/1973 | Hartigan | D04B 1/18 66/172 E |
| 3,889,494 A | * | 6/1975 | Patience | D04B 1/18 66/178 R |
| 3,937,040 A | * | 2/1976 | Negri | D04B 1/243 66/177 |
| 4,526,018 A | * | 7/1985 | Kühnert | D04B 35/06 66/70 |
| 4,818,579 A | * | 4/1989 | Uchida | C02F 3/10 112/429 |

(Continued)

FOREIGN PATENT DOCUMENTS

| | | |
|---|---|---|
| JP | 2017-206089 A | 11/2017 |
| JP | 2017206089 A * | 11/2017 |

*Primary Examiner* — Shin H Kim
(74) *Attorney, Agent, or Firm* — Paratus Law Group, PLLC

(57) ABSTRACT

A trim cover for a seat includes: a high extensible skin material; and a low extensible skin material. A joint part of the edge portion of the high extensible skin material and the edge portion of the low extensible skin material has a plurality of highly extensible protrusions and a plurality of low extensible protrusions, the plurality of highly extensible protrusions and the plurality of low extensible protrusions are each formed in a sharp tapered shape and are arranged alternately in an extending direction of the joint part, and at least a part of a boundary line between the highly extensible protrusion and the low extensible protrusion, which are adjacent in the extending direction of the joint part, is deviated from a line segment formed by connecting respective tips of the highly extensible protrusion and the low extensible protrusion to the low extensible protrusion side.

6 Claims, 9 Drawing Sheets

(56) References Cited

U.S. PATENT DOCUMENTS

| | | | | |
|---|---|---|---|---|
| 5,577,398 | A * | 11/1996 | Jeffcoat | B60N 2/5891 |
| | | | | 66/64 |
| 6,234,305 | B1 * | 5/2001 | Brown | F16G 3/10 |
| | | | | 198/844.2 |
| 6,840,067 | B2 * | 1/2005 | Mass | D04B 21/12 |
| | | | | 66/203 |
| 10,343,567 | B1 * | 7/2019 | Reel | B60N 2/5883 |
| 2006/0232111 | A1 * | 10/2006 | Hasegawa | B62J 1/18 |
| | | | | 297/219.11 |
| 2010/0140998 | A1 * | 6/2010 | Walker | A47C 7/46 |
| | | | | 297/284.1 |
| 2018/0022254 | A1 * | 1/2018 | Nishino | B60N 2/5883 |
| | | | | 297/452.62 |
| 2019/0031062 | A1 * | 1/2019 | Suzuki | B60N 2/5883 |
| 2019/0375319 | A1 * | 12/2019 | Ishii | B60N 2/5883 |

* cited by examiner

_US 10,759,313 B2_

TRIM COVER AND VEHICLE SEAT

CROSS-REFERENCE TO RELATED APPLICATION(S)

This application is based upon and claims the benefit of priority from Japanese Patent Application No. 2018-108571, filed on Jun. 6, 2018, the entire contents of which are incorporated herein by reference.

BACKGROUND

1. Field of the Invention

The present invention relates to a trim cover and a vehicle seat.

2. Description of the Related Art

A trim cover in which an extensibility is partially different in order to improve a functionality of a trim cover is known as a trim cover of a vehicle seat mounted in a.

vehicle such as an automobile. However, such a kind of trim cover has a high extensible skin material and a low extensible skin material, and the extensibility is rapidly changed at a joint part of the high extensible skin material and the low extensible skin material. For this reason, an occupant sitting on the vehicle seat may feel uncomfortable.

In the trim cover described in JP-A-2017-206089, a plurality of triangular protrusions are provided in each of a highly extensible material and a low extensible material in order to gently change the extensibility of the joint part of the high extensible skin material and the low extensible skin material. In the joint part of both materials, the protrusions of the highly extensible material and the protrusions of the low extensible material are arranged alternately.

According to the trim cover described in JP-A-2017-2.06089, the extensibility of the joint part of the high extensible skin material and the low extensible skin material is changed gently.

However, the discomfort which a seated person feels is not reduced sufficiently, which is room for improvement.

SUMMARY

The invention has been made in consideration of the above situation, and an object thereof is to sufficiently reduce a discomfort which a seated person feels by gently changing an extensibility of a joint part of a high extensible skin material and a low extensible skin material of a trim cover of a vehicle seat.

According to an aspect of the invention, there is provided a trim cover for a seat including: a high extensible skin material; and a low extensible skin material, wherein: an edge portion of the high extensible skin material and an edge portion of the low extensible skin material are bonded to each other; a joint part of the edge portion of the high extensible skin material and the edge portion of the low extensible skin material has a plurality of highly extensible protrusions provided in the edge portion of the high extensible skin material and a plurality of low extensible protrusions provided in the edge portion of the low extensible skin material; the plurality of highly extensible protrusions and the plurality of low extensible protrusions are each formed in a sharp tapered shape and are arranged alternately in an extending direction of the joint part; and at least a part of a boundary line between the highly extensible protrusion and the low extensible protrusion, which are adjacent in the extending direction of the joint part, is deviated from a line segment formed by connecting respective tips of the highly extensible protrusion and the low extensible protrusion to the low extensible protrusion side.

According to another aspect of the invention, there is provided a vehicle seat including: the trim cover according to the aspect; and a cushion pad covered with the trim cover.

According to the invention, the discomfort which the seated person feels can be reduced sufficiently by gently changing the extensibility of the joint part of the high extensible skin material and the low extensible skin material of the trim cover of the vehicle seat.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
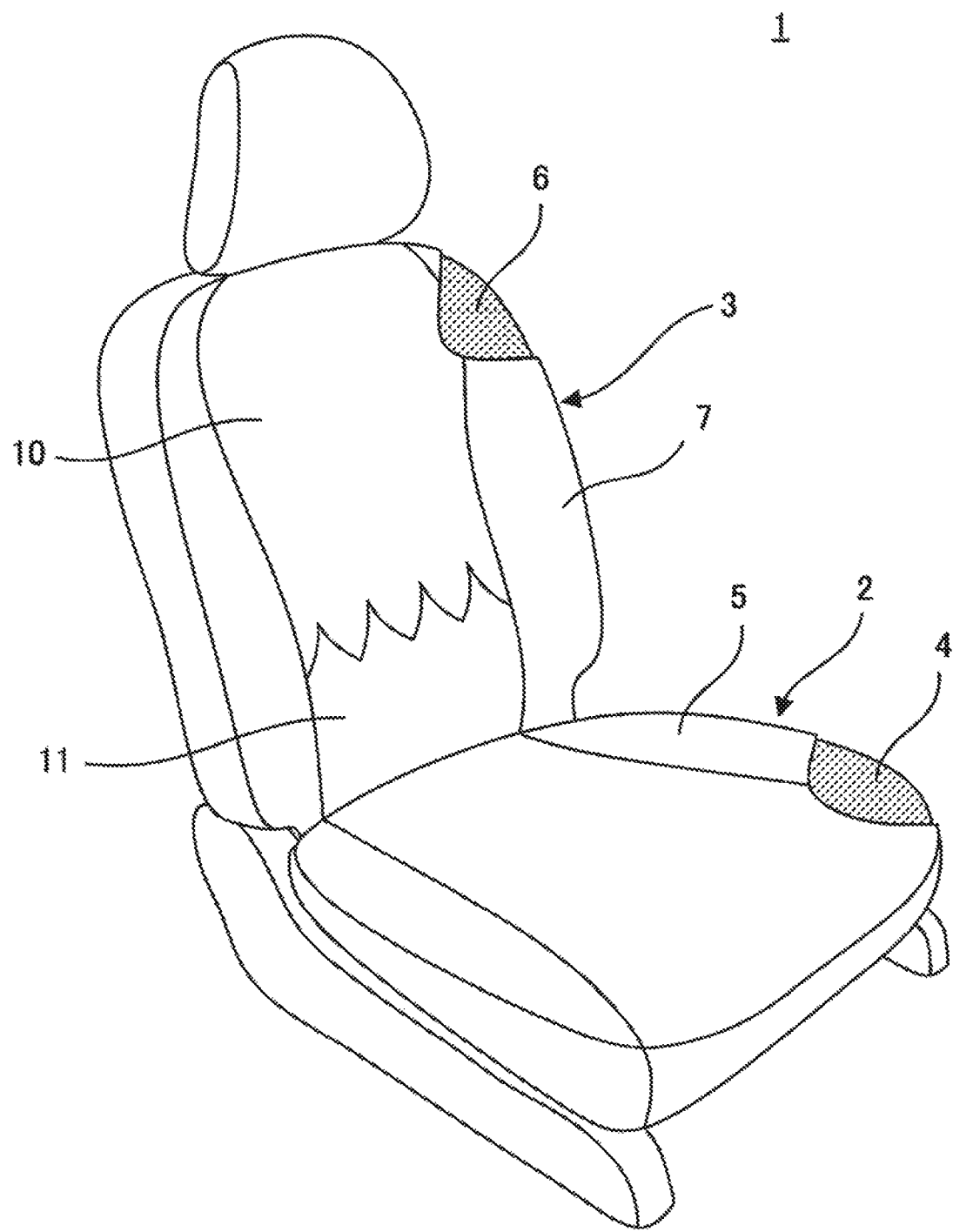
FIG. 1 is a perspective view of a vehicle seat for explaining an embodiment of the invention.
Figure 2:
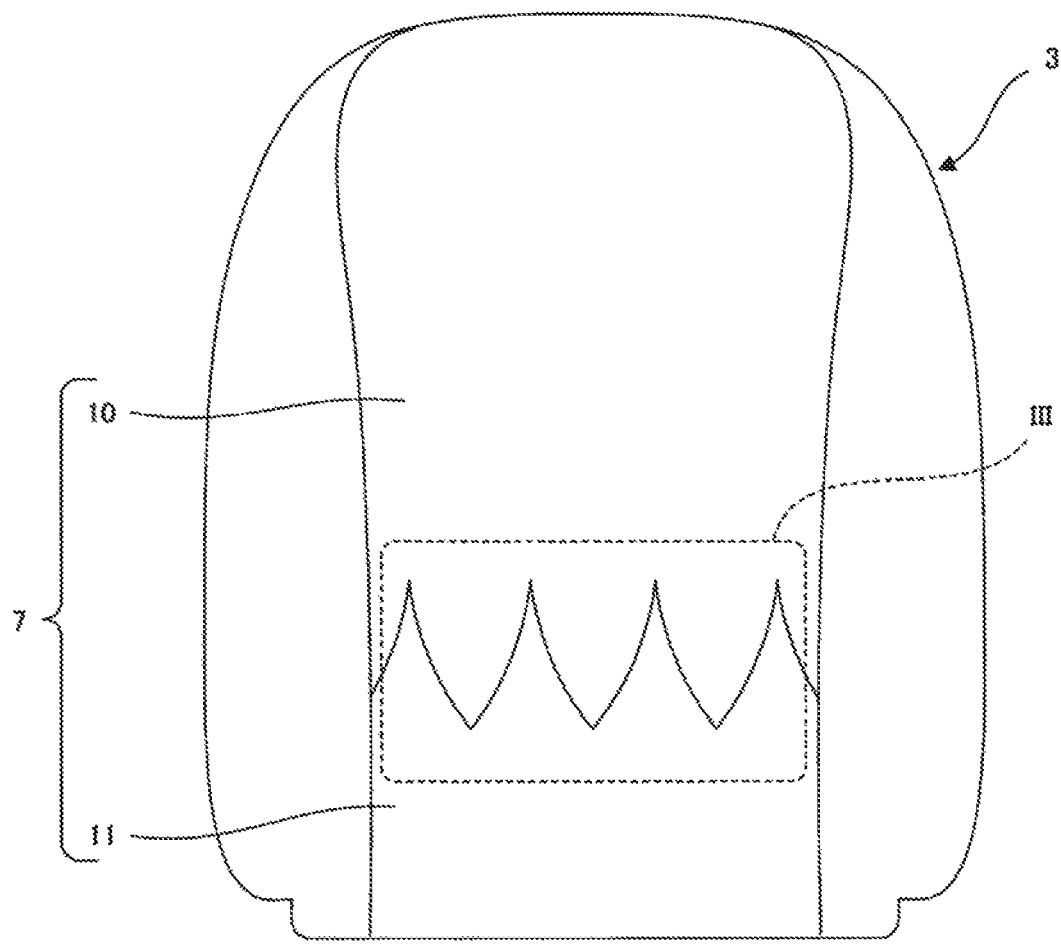
FIG. 2 is a front view of a trim cover of a seat back of the vehicle seat of FIG. 1.

FIG. 1 illustrates one example of a vehicle seat for explaining an embodiment of the invention, and FIG. 2 illustrates a trim cover of a seat back of the vehicle seat of FIG. 1.

For example, a vehicle seat 1 is a seat provided in a vehicle such as an automobile and includes a seat cushion 2 which supports a hip part and a thigh part of an occupant (hereinafter, referred to as a seated person) sitting on the seat 1, and a seat back 3 which supports a waist part and a back part of the seated person.

The seat cushion 2 includes a metallic frame (not illustrated) forming a skeleton of the seat cushion 2. The frame is covered with a cushion pad 4 made of a relatively soft foam resin material such as a urethane foam, and the cushion pad is covered with a trim cover 5.

The seat back 3 also includes a metallic frame (not illustrated) forming the skeleton of the seat back 3. The frame is covered with a cushion pad 6 made of a relatively soft foam resin material such as a urethane foam, and the cushion pad is covered with a trim cover 7.

A plurality of skin materials are bonded to the trim cover 5 of the seat cushion and the trim cover 7 of the seat back 3. For example, leather (natural leather, synthetic leather), cloth (knit, woven fabric, nonwoven fabric) or the like is used for the skin material. The skin material may have a single layer structure of leather or cloth or may have a multilayer structure in which the leather or the cloth is set as a front fabric, and a wadding (a resin foam such as an elastically deformable soft polyurethane foam) is laminated on the leather or the cloth.

The trim cover 7 of the seat back 3 is formed of a plurality of kinds of skin materials which are different depending on parts, and includes a high extensible skin material having a relatively high extensibility and a low extensible skin material having a relatively low extensibility. In the example illustrated in FIGS. 1 and 2, the high extensible skin material 10 is arranged in a seat upper portion of a center support extending in a seat vertical direction in a central portion of the seat back 3 in a seat width direction, and the low extensible skin material 11 is arranged in a seat lower portion of the center support.

Incidentally, the arrangement of the high extensible skin material and the low extensible skin material in the trim cover 7 is not limited to the example illustrated in FIGS. 1 and 2. For example, the high extensible skin material may be arranged in the center support, and the low extensible skin material may be arranged in a side support. In addition, the high extensible skin material may be arranged in the central portion of the center support in the seat vertical direction, and the low extensible skin material may be arranged in the seat upper portion and the seat lower portion of the center support. In addition, instead of the trim cover 7 of the seat back 3 or in addition to the trim cover 7 of the seat back 3, the trim cover 5 of the seat cushion 2 may include the high extensible skin material and the low extensible skin material.

Figure 3:
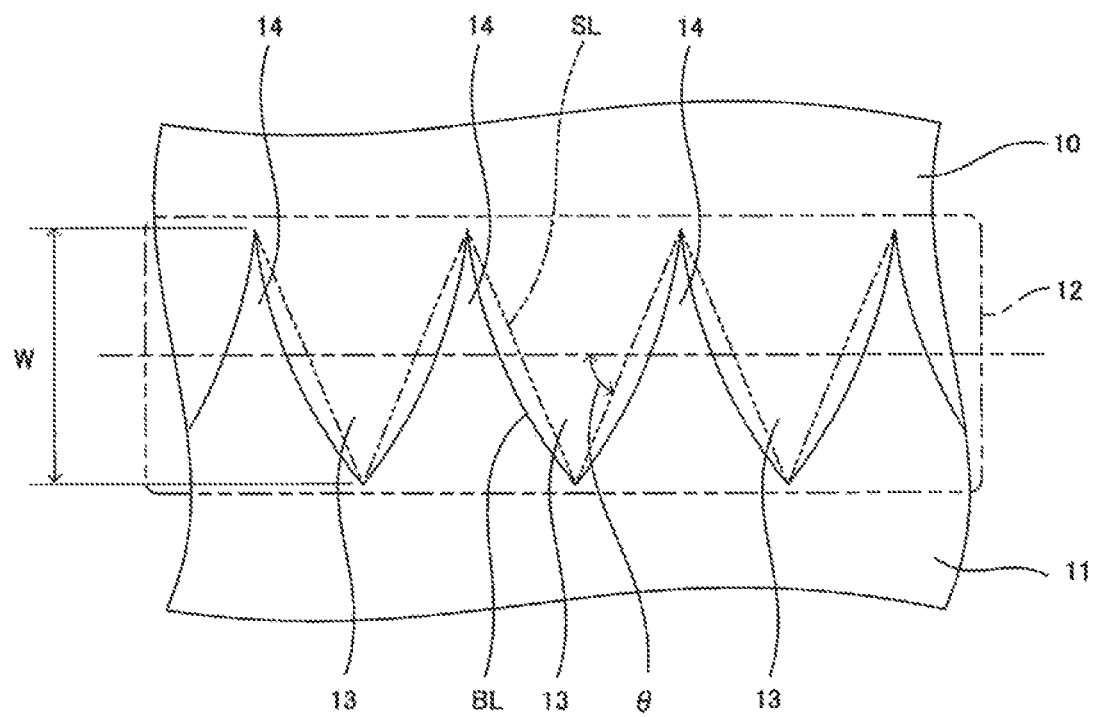
FIG. 3 is an enlarged view of a portion of the trim cover of FIG. 2 surrounded by a broken line frame III.

FIG. 3 illustrates the joint part of the high extensible skin material 10 and the low extensible skin material 11 in the trim cover 7 of the seat back 3 by enlarging the joint part.

The high extensible skin material 10 and the low extensible skin material 11 are provided adjacently in the seat vertical direction, and the lower edge portion of the high extensible skin material 10 and the upper edge portion of the low extensible skin material 11 are bonded to each other. The high extensible skin material 10 and the low extensible skin material 11 are bonded by sewing or adhering, for example. In addition, in a case where both of the high extensible skin material 10 and the low extensible skin material 11 are knitted, the high extensible skin material 10 and the low extensible skin material 11 may be bonded by knitting. In a case where the materials are bonded by knitting, the high extensible skin material 10 and the low extensible skin material 11 can be configured by a piece of knit fabric.

The joint part 12 of the high extensible skin material 10 and the low extensible skin material 11 extends in the seat width direction. The joint part 12 has a plurality of highly extensible protrusions 13 which are provided in the lower edge portion of the high extensible skin material 10 and a plurality of low extensible protrusions 14 which are provided in the upper edge portion of the low extensible skin material 11.

The highly extensible protrusion 13 protrudes to the seat lower side, and the low extensible protrusion 14 protrudes to the seat upper side. Each protrusion is formed in a sharp tapered shape. Further, the high extensible skin material 10 and the low extensible skin material 11 are bonded such that the highly extensible protrusion 13 and the low extensible protrusion 14 are alternately arranged in an extending direction of the joint part 12, and the plurality of highly extensible protrusions 13 and the plurality of low extensible protrusions 14 are engaged with each other.

A line segment which connects respective tip portions of two of the highly extensible protrusion 13 and the low extensible protrusion 14 which are adjacent in the extending direction of the joint part 12 is set as SL. At least a part of a boundary line BL between two of the highly extensible protrusion 13 and the low extensible protrusion 14 is deviated from the line segment SL to the low extensible protrusion 14 side. In this example, the boundary line BL is formed in a circular arc shape, the entire boundary line BL is deviated from the line segment SL to the low extensible protrusion 14 side, and the central portion of the boundary line BL is separated most from the line segment SL.

In the joint part 12 configured as above, as for a ratio of the highly extensible protrusion 13 and the low extensible protrusion 14 on the line extending in the extending direction of the joint part 12, the ratio of the highly extensible protrusion 13 is relatively large in the seat upper side of the joint part 12, the ratio of the low extensible protrusion 14 is relatively large in the seat lower side of the joint part 12 and the ratio is changed continuously in the seat vertical direction. Therefore, the extensibility of the joint part 12 is changed continuously in the seat vertical direction which is the arrangement direction of the high extensible skin material 10 and the low extensible skin material 11.

Compared to a case where all the plurality of highly extensible protrusions 13 and the plurality of low extensible protrusions 14 are formed in a triangular shape, and the boundary line BL between two adjacent highly extensible protrusion 13 and low extensible protrusion 14 is formed linearly along the line segment SL, the extensibility of the joint part 12 is changed gently in such a manner that at least a part of the boundary line BL is deviated from the line segment SL to the low extensible protrusion 14. Accordingly, it is possible to sufficiently reduce the discomfort which the seated person feels.

Preferably, as in the example illustrated in FIG. 3, the boundary line BL between two of the adjacent highly extensible protrusion 13 and low extensible protrusion 14 is formed in a circular arc shape, and the central portion of the boundary line BL is separated most from the line segment SL. Accordingly, the extensibility of the joint part 12 can be changed more gently.

In addition, preferably, the intersection angle θ between the line segment SL formed by connecting respective tips of two of the adjacent highly extensible protrusion 13 and low extensible protrusion 14 and the extending direction of the joint part 12 is equal to or more than 22.5°. When the intersection angle θ is set to be equal to or more than 22.5°, the extensibility of the joint part 12 can be changed more gently.

Preferably, each protruding length of the highly extensible protrusion 13 and the low extensible protrusion 14, that is, a width W of the joint part 12 is 50 mm or more. In a case where the width W of the joint part 12 is 50 mm or more, the operational effect of making the change of the extensibility of the joint part 12 gentle becomes remarkable.

Figure 4:
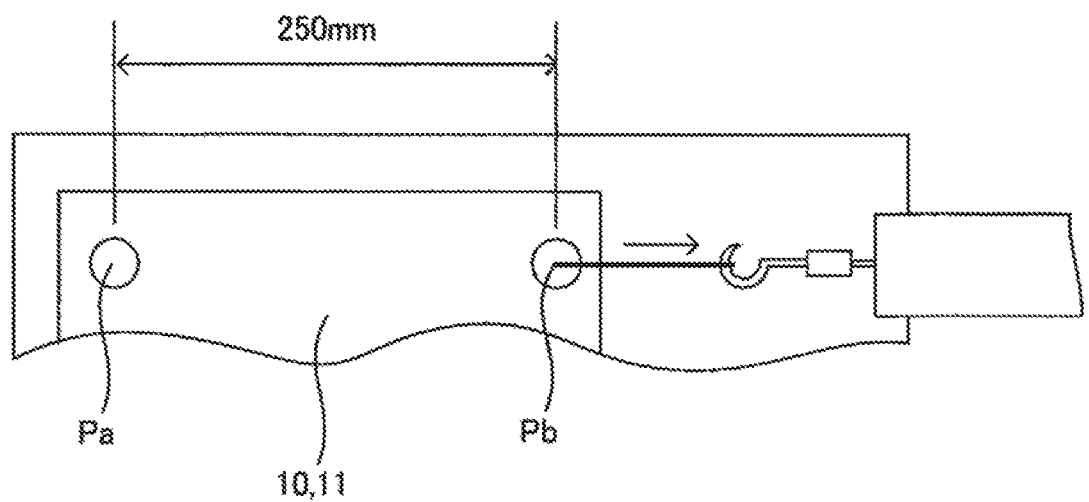
FIG. 4 is a schematic view illustrating a measuring method of an elongation rate.

Preferably, the difference between the elongation rate of the high extensible skin material 10 and the elongation rate of the low extensible skin material 11 is 20% or more. In a case where the difference in the elongation rate is 20% or more, the operational effect of making the change of the extensibility of the joint part 12 gentle becomes remarkable. Incidentally, as illustrated in FIG. 4, the elongation rate is an elongation rate between two points Pa and Pb when in two points Pa and Pb separated by 250 mm in the direction corresponding to the extending direction of the joint part 12 in the skin material of the measurement target, one point Pa is fixed, and the other point Pb is pulled by the force of 50 N.

Hereinafter, the operational effect of the invention will be described on the basis of the experimental example.

First, a relation between the shape of the boundary line BL between two of the highly extensible protrusion 13 and the low extensible protrusion 14 which are adjacent in the extending direction of the joint part 12 and the change of the extensibility of the joint part 12 is evaluated.

Figure 5:
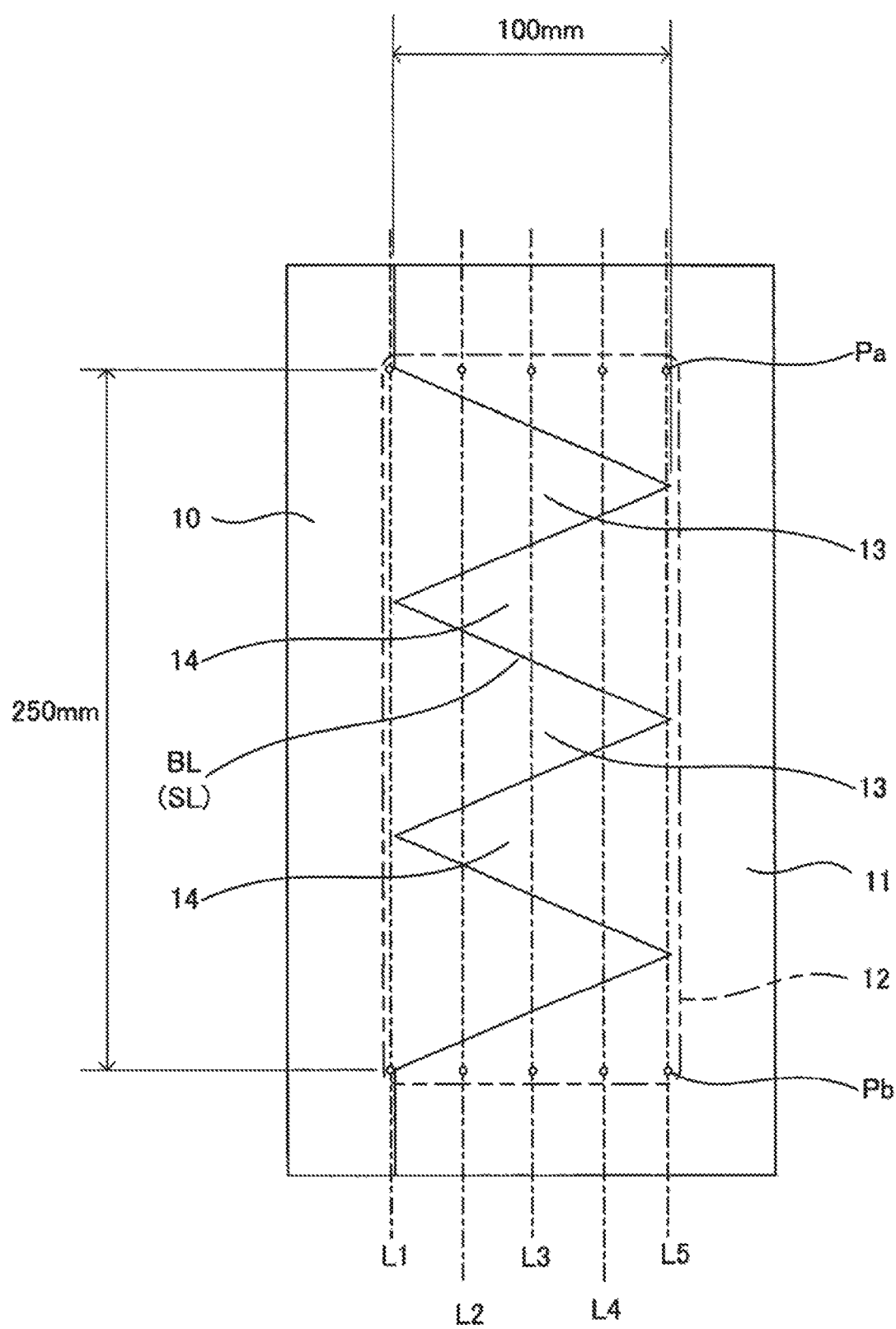
FIG. 5 is a front view of a joint part of a high extensible skin material and a low extensible skin material of a trim cover of a first experimental example.

In a trim cover of a first experimental example illustrated in FIG. 5, all the plurality of highly extensible protrusions 13 of the high extensible skin material 10 and the plurality of low extensible protrusions 14 of the low extensible skin material 11 are formed in a triangular shape, and the boundary line BL between two of the adjacent highly extensible protrusion 13 and low extensible protrusion 14 is formed linearly along the line segment SL formed by connecting respective tips of two of the highly extensible protrusion 13 and the low extensible protrusion 14. On the other hand, in a trim cover of a second experimental example illustrated in FIG. 6, the boundary line BL is formed in circular arc shapes, and the central portion of the boundary line BL is deviated from the line segment SL to the low extensible protrusion 14 side and is separated most from the line segment SL. All the widths W of the joint part 12 are 100 mm.

Figure 6:
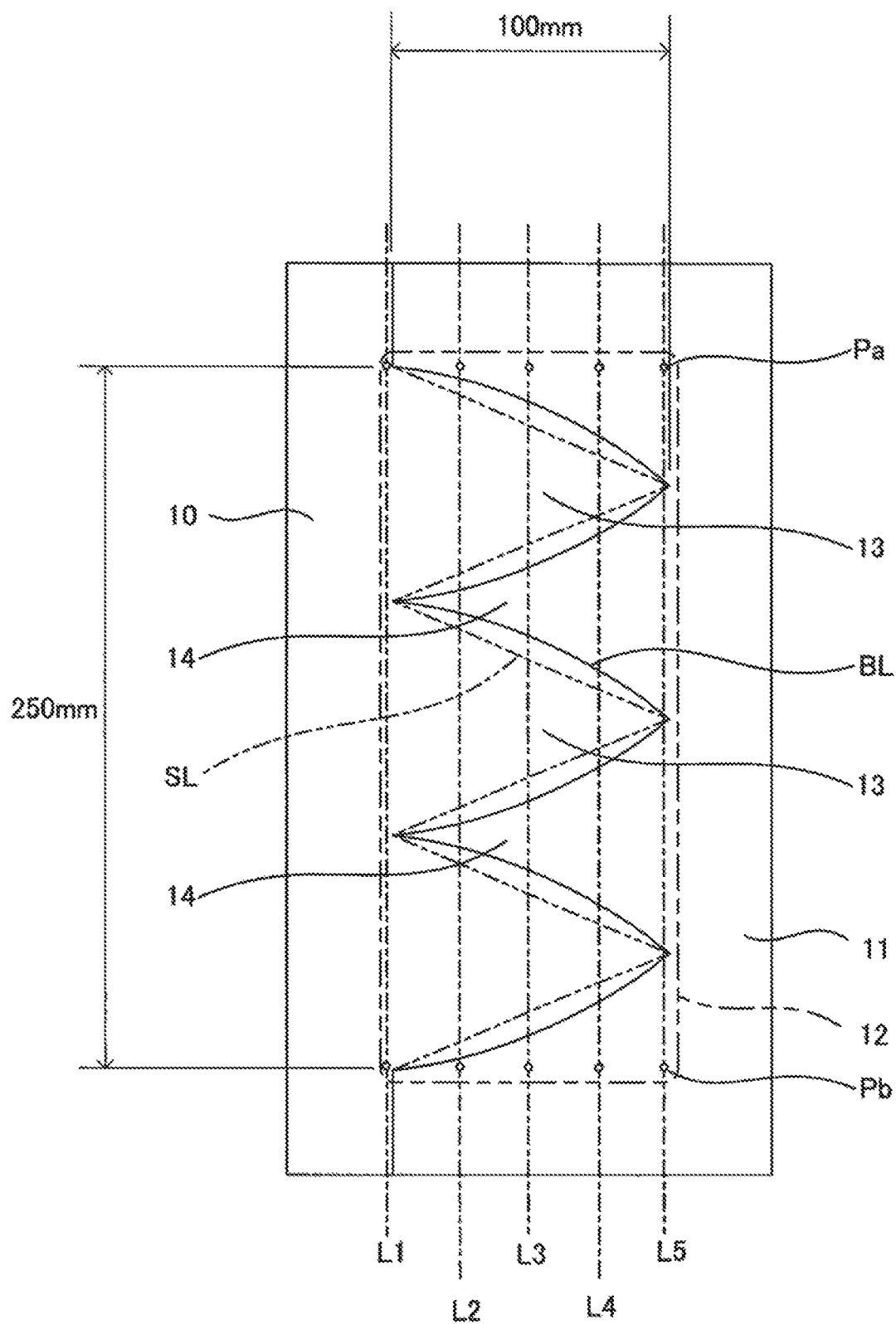
FIG. 6 is a front view of a joint part of a high extensible skin material and a low extensible skin material of a trim cover of a second experimental example.

As illustrated in FIGS. 5 and 6, five measurement lines L1 to L5 extending in the extending direction of the joint part 12 are set at intervals of 25 mm in the direction perpendicular to the extending direction of the joint part 12, two points Pa and. Pb separated by 250 mm are set on each measurement line, and the elongation rate is measured similarly to the measuring method illustrated in FIG. 4 to evaluate the change of the extensibility of the joint part 12. Incidentally, a first measurement line L1 is arranged on the side of the joint part 12 closest to the high extensible skin material 10, and a fifth measurement line L5 is arranged on the side of the joint part 12 closest to the low extensible skin material 11.

Figure 7:
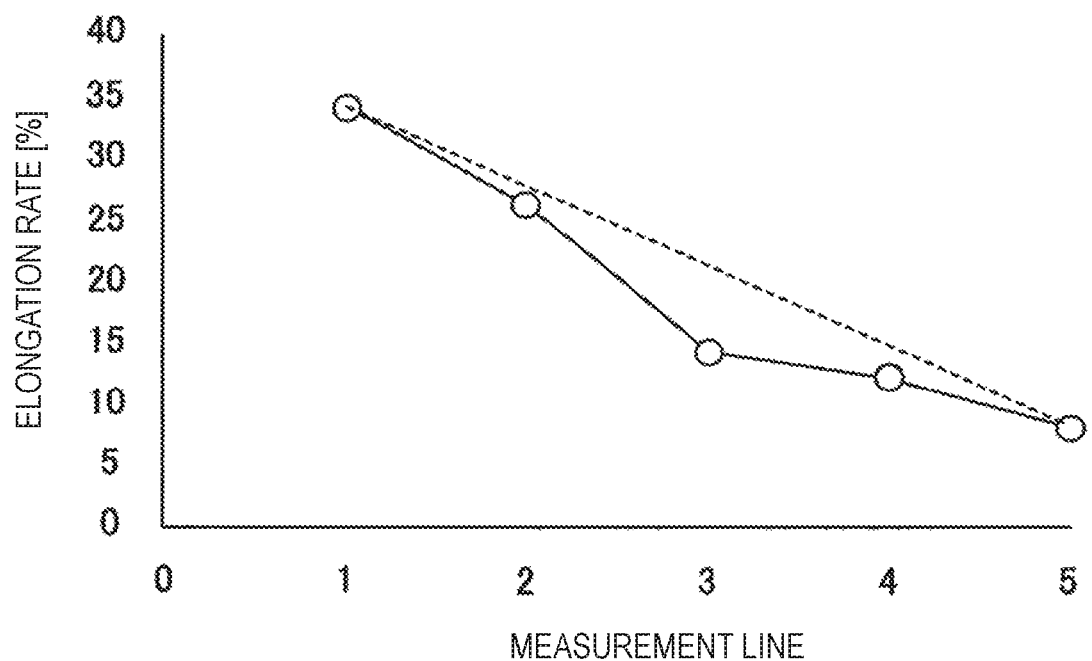
FIG. 7 is a graph showing an extensibility of the joint part of the trim cover of the first experimental example.
Figure 8:
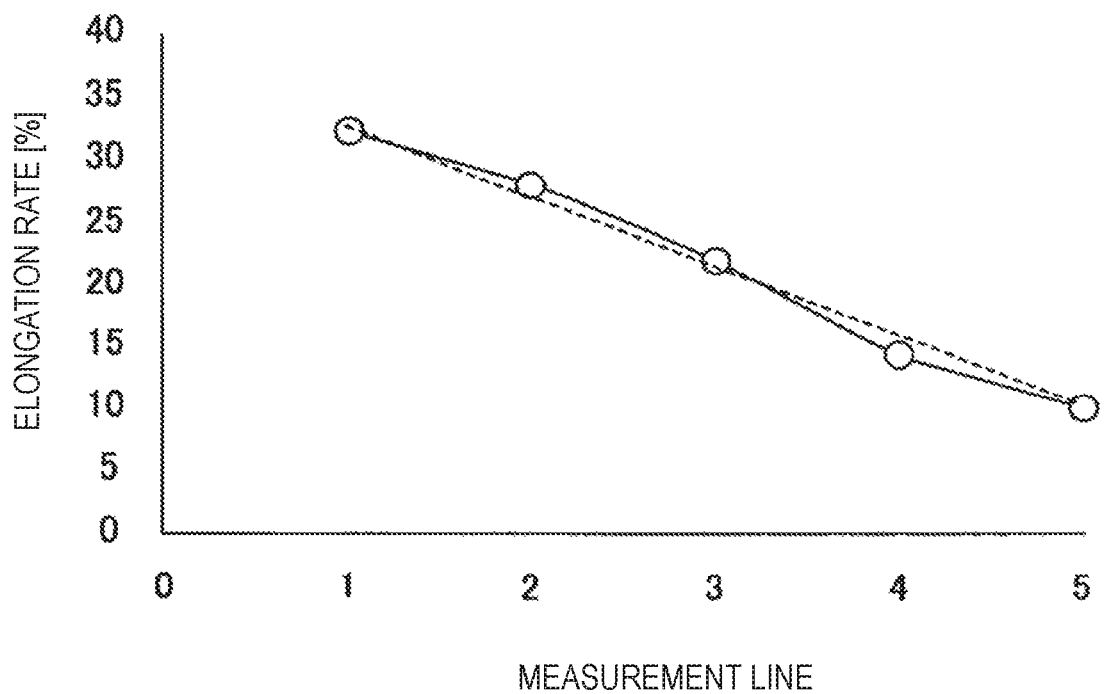
FIG. 8 is a graph showing an extensibility of the joint part of the trim cover of the second experimental example.

FIG. 7 shows the extensibility of the joint part 12 of the trim cover of the first experimental example illustrated in FIG. 5, and FIG. 8 shows the extensibility of the joint part 12 of the trim cover of the second experimental example illustrated in FIG. 6. The graphs shown in FIGS. 7 and 8 are obtained by plotting the elongation rate in the measurement lines L1 (i=1 to 5).

In the trim cover of the first experimental example and the trim cover of the second experimental example, in common, the elongation rate gradually decreases from the first measurement line L1 on the high extensible skin material 10 side toward the fifth measurement line L5 on the low extensible skin material 11 side. However, as illustrated in FIG. 7, in the trim cover of the first experimental example, the characteristic line formed by sequentially connecting the elongation rates in the measurement lines L1 (i=1 to 5) is bent relatively largely in a central third measurement line L3. On the other hand, as illustrated in FIG. 8, in the trim cover of the second experimental example, it is found that the characteristic line formed by sequentially connecting the elongation rates in the measurement lines L1 (i=1 to 5) is overall linear, and the extensibility of the joint part 12 is changed gently.

Next, the relation between the intersection angle θ (see FIG. 3) between the line segment SL formed by connecting respective tips of two of the highly extensible protrusion 13 and the low extensible protrusion 14 which are adjacent in the extending direction of the joint part 12 and the extending direction of the joint part 12 and the extensibility of the joint part 12 is evaluated.

In this evaluation, a single kind of skin material as a reference example is used. In the skin material of a first reference example illustrated in FIG. 9A, a stitch is not formed, and the elongation rate between two points Pa and Pb of the skin material is used as a reference. In the skin material of a second reference example illustrated in FIG. 9B, a stitch S is formed in a linear shape to pass through two points Pa and Pb of the skin material. In a skin material of a third reference example illustrated in FIG. 9C, a skin material of a fourth reference example illustrated in FIG. 9D, and a skin material of a fifth reference example illustrated in FIG. 9E, the stitch S is formed to have such a zigzag shape to repeatedly intersect with a straight line passing through two points Pa and Pb. Further, the skin materials of the third to fifth reference examples are different from each other in the intersection angle φ between the stitch S and the straight line passing through two points Pa and Pb, and the intersection angle φ is set to be 22.5° in the skin material of the third reference example, is set to be 45° in the skin material of the fourth reference example, and is set to be 67.5° in the skin material of the fifth reference example. The result obtained by measuring the elongation rate between two points Pa and Ph in each skin material of the first to fifth reference examples is shown in table 1.

TABLE 1

|  | Intersection Angle φ [°] | Elongation Rate [%] |
| --- | --- | --- |
| First Reference Example | — | 25 |
| Second Reference Example | 0 | 20 |
| Third Reference Example | 22.5 | 22.5 |
| Fourth Reference Example | 45 | 25 |
| Fifth Reference Example | 67.5 | 25 |

The suture forming the stitch S does not extend basically. Thus, it is found that in the skin material of the second reference example in which the stitch S is formed linearly along the measuring direction of the elongation rate, the extensibility of the skin material is suppressed by the stitch S. Further, from the result obtained by measuring each elongation rate of the skin materials of the third to fifth reference examples, it is found that as the intersection angle φ between the stitch S and the straight line passing through two points Pa and Ph becomes larger, the effect of the stitch S on the extensibility of the skin material is reduced. The solidified body of the adhesive also does not extend basically. Thus, in a case Where the adhesive is applied linearly instead of the stitch S, as the intersection angle between the adhering line and the straight line passing through two points Pa and Ph becomes larger, the effect of the adhesive on the extensibility of the skin material is reduced similarly.

In the trim cover 7 illustrated in FIG. 3, in a case where the high extensible skin material 10 and the low extensible skin material 11 are bonded by sewing or adhering, the sewing line or the adhering line is provided on the boundary line BL between two of the adjacent highly extensible protrusion 13 and low extensible protrusion 14 in the extending direction of the joint part 12, and extends substantially along the line segment SL formed by connecting respective tip portions of two of the highly extensible protrusion 13 and the low extensible protrusion 14. Further, the line segment SL corresponds to the stitch S of the skin material of the reference examples illustrated in FIGS. 9C to 9E. The intersection angle θ between the line segment SL and the extending direction of the joint part 12 corresponds to the intersection angle φ between the stitch S of the skin material of the reference example and the straight line passing through two points Pa and Ph.

Figure 9:
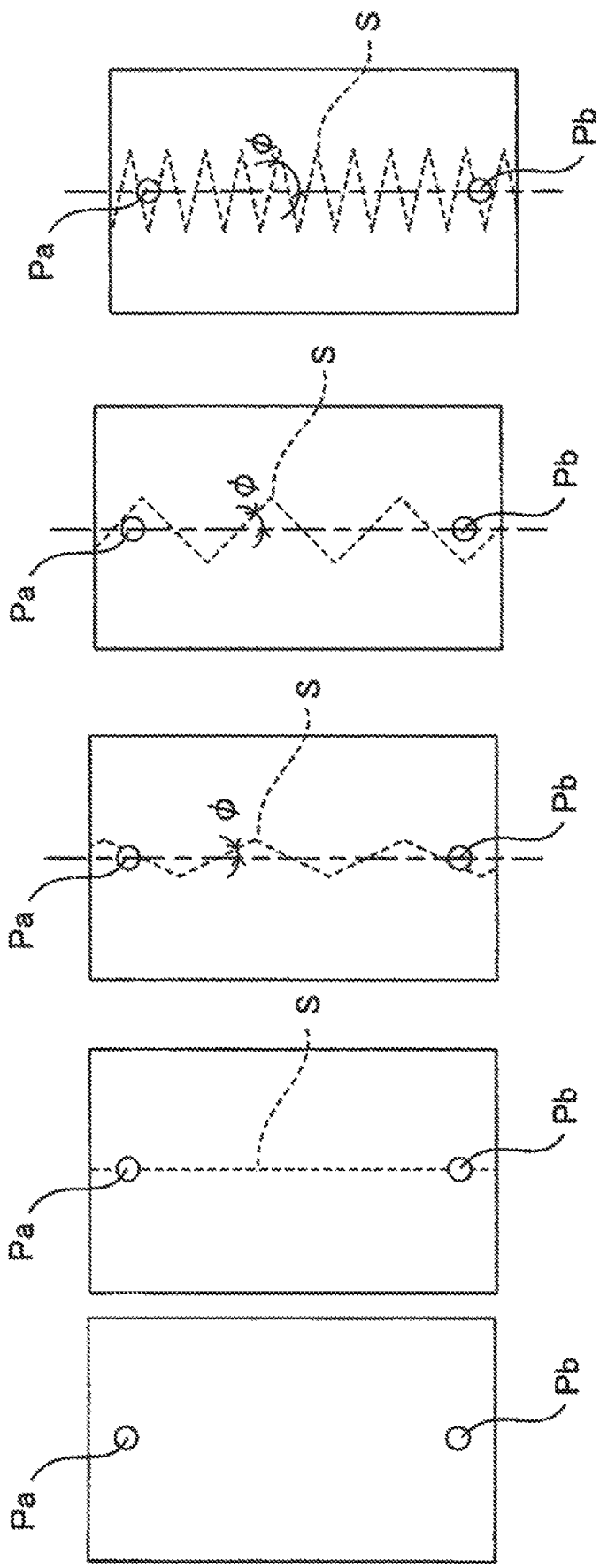
FIGS. 9A to 9E are schematic views illustrating a configuration of a skin material of a reference example.

Therefore, the relation between the effect of the sewing line or the adhering line formed on the boundary line BL on the extensibility of the joint part 12 and the intersection angle θ conforms to the relation between the effect of the stitch S of the skin material of the reference examples illustrated in FIGS. 9C to 9E on the extensibility of the skin material and the intersection angle φ. In this regard, in terms of gently changing the extensibility of the joint part 12, the intersection angle θ is preferably from 22.5° to 90°, and more preferably from 45° to 90°.

Next, the relation between the difference between the elongation rate of the high extensible skin material 10 and the elongation rate of the low extensible skin material 11 and the extensibility of the joint part 12 is evaluated.

In this evaluation, the trim cover of the first experimental example illustrated in FIG. 5 and the trim cover of the third experimental example configured similarly to the trim cover of the first experimental example except for respective elongation rates of the high extensible skin material 10 and the low extensible skin material 11 are used. In the trim cover of the first experimental example, the elongation rate of the high extensible skin material 10 is 34%, the elongation rate of the low extensible skin material 11 is 8%, and the difference in the elongation rate is 26%. On the other hand, in the trim cover of the third experimental example, the elongation rate of the high extensible skin material 10 is 34%, the elongation rate of the low extensible skin material 11 is 18%, and the difference in the elongation rate is 16%. As illustrated in FIG. 5, five measurement lines L1 to L5 extending in the extending direction of the joint part 12 are set at intervals of 25 mm in the direction perpendicular to the extending direction of the joint part 12, the points Pa and Pb separated by 250 mm are set on each measurement line, and the change of the extensibility of the joint part 12 is evaluated.

The extensibility of the joint part 12 of the trim cover of the first experimental example is as shown in FIG. 7. In the trim cover of the first experimental example in which the difference in the elongation rate is 26%, the characteristic line formed by sequentially connecting the elongation rates in the measurement lines L1 (i=1 to 5) is bent relatively largely in the central third measurement line L3. In this case, as in the trim cover of the second experimental example illustrated in FIG. 6, at least a part of the boundary line BL between two of the adjacent highly extensible protrusion 13 and low extensible protrusion 14 is deviated from the line segment SL formed by connecting respective tips of two of the highly extensible protrusion 13 and the low extensible protrusion 14 to the low extensible protrusion 14 side. Thus, the characteristic line is changed overall linearly, and the change of the extensibility of the joint part 12 becomes gentle.

Figure 10:
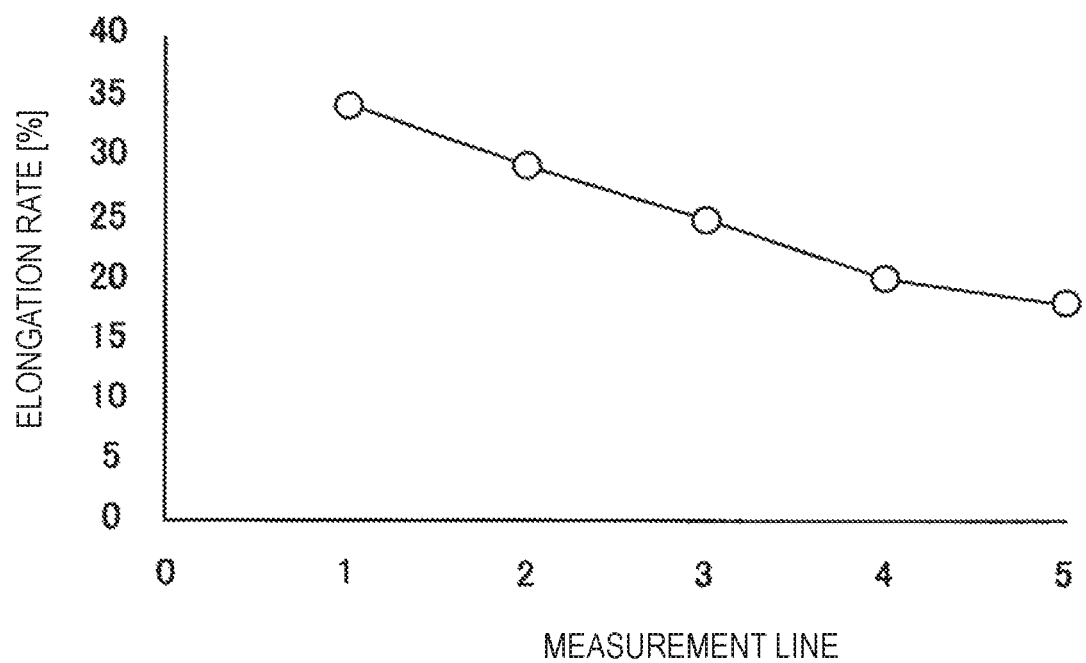
FIG. 10 is a graph showing an extensibility of a joint part of a trim cover of a third experimental example.

FIG. 10 shows the extensibility of the joint part 12 of the trim cover of the third experimental example. It is found that in the trim cover of the third experimental example in which the difference in the elongation rate is 16%, the characteristic line formed by sequentially connecting the elongation rates in the measurement lines L1 (i=1 to 5) is closer to a straight line compared to the first experimental example. In this case, although at least a part of the boundary line BL is configured to be deviated from the line segment SL to the low extensible protrusion 14 side, the change of the extensibility of the joint part 12 is limited compared to the first experimental example.

From the above results, it is found that in a case where the difference between the elongation rate of the high extensible skin material 10 and the elongation rate of the low extensible skin material 11 is 20% or more, the operational effect made when at least a part of the boundary line BL is deviated from the line segment SL to the low extensible protrusion 14 side, that is, the operational effect of making the change of the extensibility of the joint part 12 gentle becomes remarkable.

Next, the relation between the width W (see FIG. 3) of the joint part 12 and the change of the extensibility of the joint part 12 is evaluated.

In this evaluation, the trim cover of the first experimental example illustrated in FIG. 5, the trim cover of the fourth experimental example configured similarly to the trim cover of the first experimental example except for the width \V of the joint part 12, and the trim cover of the fifth experimental example configured similarly to the trim cover of the second experimental example except for the width W of the joint part 12 are used. In the trim cover of the first experimental example, the width W of the joint part 12 is 100 mm. On the other hand, in the trim cover of the fourth experimental example and the trim cover of the fifth experimental example, all the widths W of the joint part 12 are 50 nun. As illustrated in FIG. 5, in the trim cover of the first experimental example, five measurement lines L1 to L5 extending in the extending direction of the joint part 12 are set at intervals of 25 mm in the direction perpendicular to the extending direction of the joint part 12, two points Pa and Ph separated by 250 mm are set on each measurement line, and the change of the extensibility of the joint part 12 is evaluated. In addition, in the trim cover of the fourth experimental example and the trim cover of the fifth experimental example, three measurement lines L1 to L3 extending in the extending direction of the joint part 12 are set at intervals of 12.5 mm in the direction perpendicular to the extending direction of the joint part 12, two points Pa and Pb separated by 250 mm are set on each measurement line, and the change of the extensibility of the joint part 12 is evaluated.

The extensibility of the joint part 12 of the trim cover of the first experimental example is as shown in FIG. 7. In the trim cover of the first experimental example in which the width W of the joint part 12 is 100 mm, the characteristic line formed by sequentially connecting the elongation rates in the measurement lines Li (i=1 to 5) is bent relatively largely in the central third measurement line L3. In this case, as in the trim cover of the second experimental example illustrated in FIG. 6, at least a part of the boundary line BL between two of the adjacent highly extensible protrusion 13 and low extensible protrusion 14 is deviated from the line segment SL formed by connecting respective tips of two of the highly extensible protrusion 13 and the low extensible protrusion 14 to the low extensible protrusion 14 side. Thus, the characteristic line is changed overall linearly, and the change of the extensibility of the joint part 12 becomes gentle.

Figure 11:
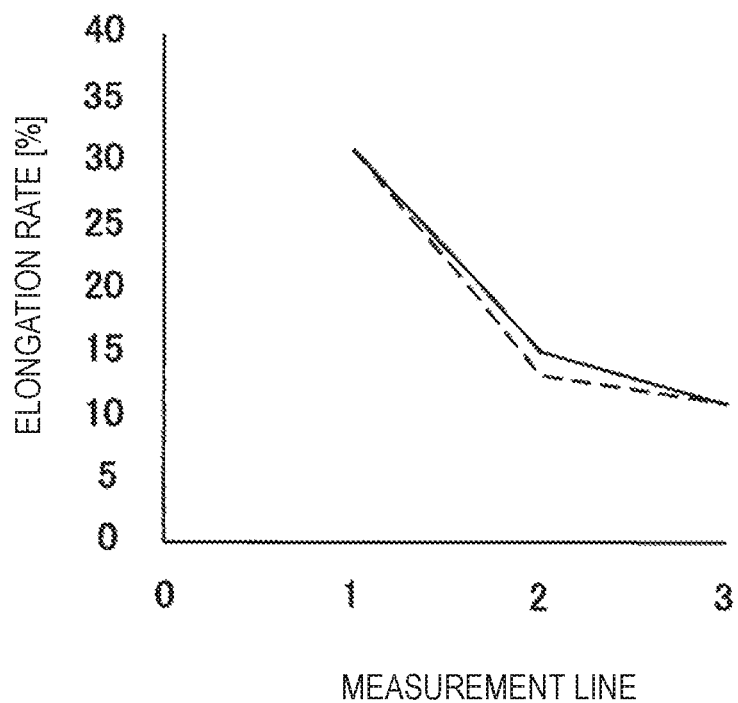
FIG. 11 is a graph showing an extensibility of each joint part of a trim cover of a fourth experimental example and a trim cover of a fifth experimental example.

FIG. 11 shows the extensibility of each joint part 12 of the trim cover of the fourth experimental example and the trim cover of the fifth experimental example. In the trim cover of the fourth experimental example in which the width W of the joint part 12 is 50 mm, and the boundary line BL is formed linearly along the line segment SL, as illustrated by the broken line of FIG. 11, the characteristic line formed by sequentially connecting the elongation rates in the measurement lines L1 (i=1 to 3) is bent relatively largely in the central second measurement line L2 similarly to the first experimental example. On the other hand, in the trim cover of the fifth experimental example in which the width W of the joint part 12 is 50 mm, the boundary line BL is formed in a circular arc shape, and the central portion of the boundary line BL is deviated from the line segment SL to the low extensible protrusion 14 side, as illustrated by a solid line of FIG. 11, it is found that the characteristic line formed by sequentially connecting the elongation rates in the measurement lines Li (i=1 to 3) is closer to a straight line compared to the fourth experimental example, and the change of the extensibility of the joint part 12 becomes gentle. However, the change of the extensibility of the joint part 12 between the fourth experimental example and the fifth experimental example is limited compared to the change of the extensibility of the joint part 12 between the first experimental example and the second experimental example.

From the above results, in a case where the width W of the joint part 12 is 50 mm or more, the operational effect made when at least a part of the boundary line BL is deviated from the line segment SL to the low extensible protrusion 14 side, that is, the operational effect of making the change of the extensibility of the joint part 12 gentle becomes remarkable. More preferably, the width W of the joint part 12 is 100 mm or more.

Hereinbefore, the invention is described by using the vehicle seat 1 provided in the vehicle such as the automobile as an example. However, the configuration of the vehicle seat 1 can be applied to a seat of a vehicle such as a ship or airplane other than the vehicle.

Hereinbefore, as described above, in the trim cover for seats disclosed in this specification, a plurality of skin materials are bonded. The plurality of skin materials include a high extensible skin material and a low extensible skin material. An edge portion of the high extensible skin material and an edge portion of the low extensible skin material are bonded to each other. A joint part of the edge portion of the high extensible skin material and the edge portion of the low extensible skin material has a plurality of highly extensible protrusions provided in the edge portion of the high extensible skin material and a plurality of low extensible protrusions provided in the edge portion of the low extensible skin material. The plurality of highly extensible protrusions and the plurality of low extensible protrusions are each formed in a sharp tapered shape and are arranged alternately in an extending direction of the joint part. At least a part of a boundary line between the highly extensible protrusion and the low extensible protrusion which are adjacent in the extending direction of the joint part is deviated from a line segment formed by connecting respective tips of the highly extensible protrusion and the low extensible protrusion to the low extensible protrusion side.

In the trim cover disclosed in this specification, the boundary line has a circular arc shape.

In the trim cover disclosed in this specification, an intersection angle between the line segment formed by connecting respective tips of the highly extensible protrusion and the low extensible protrusion which are adjacent in the extending direction of the joint part and the extending direction of the joint part is 22.5° or more.

In the trim cover disclosed in this specification, a difference between an elongation rate of the high extensible skin material and an elongation rate of the low extensible skin material is 20% or more.

In the trim cover disclosed in this specification, each protruding length of the highly extensible protrusion and the low extensible protrusion is 50 mm or more.

The vehicle seat disclosed in this specification includes a cushion pad covered with the trim cover.

What is claimed is:
1. A trim cover for a seat comprising:
a high extensible skin material; and
a low extensible skin material, wherein:
an edge portion of the high extensible skin material and an edge portion of the low extensible skin material are bonded to each other;
a joint part of the edge portion of the high extensible skin material and the edge portion of the low extensible skin material has a plurality of highly extensible protrusions provided in the edge portion of the high extensible skin material and a plurality of low extensible protrusions provided in the edge portion of the low extensible skin material;
the plurality of highly extensible protrusions and the plurality of low extensible protrusions are each formed in a sharp tapered shape and are arranged alternately in an extending direction of the joint part; and
at least a part of a boundary line between the highly extensible protrusion and the low extensible protrusion, which are adjacent in the extending direction of the joint part, is deviated from a line segment formed by connecting respective tips of the highly extensible protrusion and the low extensible protrusion to the low extensible protrusion side.
2. The trim cover according to claim 1, wherein the boundary line has a circular arc shape.
3. The trim cover according to claim 1, wherein an intersection angle between the line segment formed by connecting respective tips of the highly extensible protrusion and the low extensible protrusion which are adjacent in the extending direction of the joint part and the extending direction of the joint part is 22.5° or more.
4. The trim cover according to claim 1, wherein a difference between an elongation rate of the high extensible skin material and an elongation rate of the low extensible skin material is 20% or more.
5. The trim cover according to claim 1, wherein each protruding length of the highly extensible protrusion and the low extensible protrusion is 50 mm or more.
6. A vehicle seat comprising:
the trim cover according to claim 1; and
a cushion pad covered with the trim cover.

* * * * *